ary examples of the vanadium compounds
United States Patent Office 3,337,514
Patented Aug. 22, 1967

3,337,514
PROCESS FOR REMOVING VANADIUM COORDINATION CATALYST RESIDUES FROM A SOLUTION OF α-OLEFIN HYDROCARBON COPOLYMER
Louis H. Knabeschuh and Carson E. Wieland, Beaumont, Tex., assignors to E. I. du Pont de Nemours and Company, Wilmington, Del., a corporation of Delaware
No Drawing. Filed Nov. 29, 1963, Ser. No. 327,051
4 Claims. (Cl. 260—80.7)

This invention relates to the purification of α-olefin hydrocarbon copolymers and more particularly to a process for removing vanadium coordination catalyst residues from solutions of α-olefin hydrocarbon copolymers.

α-Olefin hydrocarbon copolymers are acquiring considerable commercial importance today. Particularly valuable processes for making high quality copolymers involve the use of coordination catalysts prepared from vanadium compounds. For many purposes it is absolutely essential that the copolymers be as free as possible from vanadium catalyst residue. The satisfactory purification procedures available today are not commercially attractive. Some are too slow, others are too expensive.

It is an object of the present invention to provide a process for removing vanadium coordination catalyst residues from α-olefin hydrocarbon copolymer solutions. A further object is to provide an α-olefin hydrocarbon copolymer, which has been prepared by using a vanadium coordination catalyst, having a residual vanadium content of less than about 10 parts per million (p.p.m.). Other objects will appear hereinafter.

These and other objects of the present invention are accomplished by providing a process for removing vanadium coordination catalyst residues from a solution of an α-olefin hydrocarbon copolymer, wherein said catalyst is prepared from a reducible vanadium compound and an organo-aluminum reducing compound, which process comprises (1) Contacting said copolymer solution with steam under velocity conditions sufficient to cause a turbulently flowing mixture containing at least a portion of said steam in condensed form;

(2) Contacting the mixture resulting from (1) above with dilute aqueous mineral acid under conditions of high shear agitation, with the number of gram equivalents of said acid being at least equal to the sum of the number of gram atoms of vanadium and aluminum; and (3) Countercurrently contacting the resulting mixture from (2) above with water under turbulent conditions and separating the copolymer solution from the aqueous phase.

The process of this invention provides rapid, effective and economical vanadium removal from α-olefin hydrocarbon copolymer solutions. The purified solutions themselves have valuable uses, for example in making adhesives. More frequently, the copolymers are isolated from solution and used to make a wide variety of articles. The very low vanadium content of these copolymers, e.g. less than about 10 p.p.m., makes them particularly outstanding.

The composition which is purified according to the process of the present invention comprises an α-olefin hydrocarbon copolymer solution containing residues of a coordination catalyst made from a reducible vanadium compound and an organo-aluminum reducing compound.

The hydrocarbon copolymers are normally solids and are made from mixtures of α-monoolefins with each other or with polyolefins having at least one polymerizable carbon-carbon double bond. Suitable α-monoolefins include compounds such as ethylene, propylene, 1-butene, 1-decene, 1-octadecene and 2-norbornenes. Conjugated and non-conjugated dienes are suitable polyolefins, the latter being preferred. Representative non-conjugated dienes include: 1,4-hexadiene; 1,5-hexadiene; dicyclopentadiene; 5-methylene-2-norbornene; cyclopentadiene; 1,5-cyclooctadiene. Ethylene copolymers are preferred. Illustrative copolymers include: ethylene/propylene; ethylene/1-butene; ethylene/propylene/1,4-hexadiene; ethylene/1,4-hexadiene; ethylene/propylene/dicyclopentadiene; ethylenepropylene/5-methylene-2-norbornene; ethylene/2-norbornene; ethylene/propylene/1,5-cyclooctadiene; ethylene/1,3-butadiene and ethylene/propylene/allene. Representative copolymers are disclosed in U.S. patents: 2,933,480; 3,000,866; 3,000,867; 2,975,159; 3,093,621; 3,093,620 and 3,063,973.

The copolymers described above can be prepared by contacting the monomers in an inert liquid organic medium with a coordination catalyst made from a reducible vanadium compound and an organo-aluminum compound. By the term "inert" is meant an organic liquid which does not interfere with the desired course of the reaction. Typical media include: tetrachloroethylene; aromatic solvents such as benzene, toluene, and xylenes; saturated aliphatic hydrocarbon and cycloaliphatic hydrocarbons such as cyclohexane, neopentane, isopentane, pentane, cyclopentane, n-hexane, n-heptane, methylcyclohexane, 2,2,4-trimethylpentane, n-octane, and n-nonane; chlorinated aliphatic hydrocarbons and chlorinated cycloaliphatic hydrocarbons such as carbon tetrachloride, ethyl chloride, methyl chloride, 1,2-dichloroethane and trichloromonofluoromethane.

The coordination catalyst is obtained by mixing at least one reducible vanadium compound with at least one organo-aluminum reducing compound in an inert liquid organic medium of the type described above. Representative types of reducible vanadium compounds include halides, oxyhalides, acetylacetonates and orthovanadates. Representative examples of the vanadium compounds are vanadium tetrachloride, vanadium oxytrichloride, vanadium tris(acetylacetonate), vanadium oxybis(acetylacetonate), tris(parachlorophenyl)orthovanadate and triethylorthovanadate. Representative types of organo-aluminum compounds include aluminum trialkyls; dialkyl aluminum monohalides; dialkyl aluminum monohydrides; alkyl aluminum dihalides, and unsaturated derivatives such as alkenyl aluminum dialkyls. Illustrative compounds include triethyl aluminum, triisobutyl aluminum, and diisobutyl aluminum monochloride. The catalyst can be formed before, during, or after the introduction of part or all of the copolymerizable monomers. The relative proportions of aluminum and vanadium compounds can be varied widely; those skilled in the art can determine the proportions needed to get the best catalyst activity by routine experiments. When diisobutyl aluminum monochloride is employed with vanadium oxytrichloride or vanadium tris(acetylacetonate) the Al:V molar ratio values are at least about 1.5:1 or 4:1, respectively. The particular Al:V molar ratio value is not important as far as the operability of the purification process of the present invention is concerned. The order of mixing of catalyst components and the temperatures at which they are made and used are, likewise, not critical. In general, the vanadium concentration of the copolymer solutions before purification will be fairly high. The object is to obtain a final vanadium concentration in the copolymer, on a dry basis, of less than about 10 p.p.m.

The copolymer concentration in the solution being purified should be as high as possible for economic reasons. The upper limit will be determined by the ability of the process equipment to handle the solution. The concentration should probably be selected to keep the solution viscosity below about 100,000 centipoises at the operating temperature. Typical viscosities have ranged up to about 40,000 centipoises. The Mooney viscosity of the dry copolymer will influence the practical concentration limit; other factors being constant, the higher the Mooney value, the lower the concentration limit. A preferred Mooney value ranges from about 40 to 70 (ML-4/250° F.)

The purification process of the present invention involves several distinct steps. In the first step a substantial proportion of the vanadium catalyst residue is removed from the copolymer solution by contact with steam, part of which condenses during the contact. The catalyst will then be largely distributed in the aqueous phase. The effectiveness of this step is enhanced by utilizing turbulence to create good liquid-vapor contact. The copolymer mixture resulting from this first step, which now contains some condensed steam, is then given a dilute aqueous mineral acid treatment under high shear agitation. This acid treatment promotes the effectiveness of the last step. In the final step, the mixture from the acid treatment step is mixed with water under turbulent conditions insuring good contact to complete catalyst removal. The need for employing each of these features will be apparent from the following discussion and the omission of any of them will reduce the effectiveness of the purification.

In the first step of the purification process, the copolymer solution is treated with live steam under velocity conditions whereby turbulent flow is achieved. The temperature of the solution is not critical and will be governed only by the vapor pressure of the solvent. This treatment may be carried out in a device such as a co-current pipeline liquid-gas contactor. When using such a device steam and copolymer solution are fed co-currently at a velocity sufficient to cause turbulent flow. Good contact between the phases results and liquid-vapor equilibrium is approached at the downstream end of the pipe. The pipe may be horizontally positioned; however, other positions are suitable (for example, the flow can be vertically downward). Another device which could be used is a homomixer wherein steam is introduced from the blades of the impeller.

The amount of steam needed can be calculated from liquid-vapor equilibria data by those skilled in the art. When this step is carried out in a co-current pipeline, liquid-gas contacting the steam supply pressure must be adequate to maintain flow against existing back pressure. 150 p.s.i.g. steam has been used for a contactor 1.04-inch in inner diameter and about 200 inches long. The dimensions of the contactor must be selected to give velocities proper for the flow rates planned. The vapor velocity can vary from about 10 to 150 ft./sec., with 20 to 90 ft./sec. being preferred. The pipeline contactor should be long enough to allow the phases to come close to ideal equilibrium. A length of 200 pipe diameters has proved to be adequate in representative operations.

As a practical matter, the copolymer solution which is to be purified may very well contain volatile components such as unreacted monomer. In general, there will also be some solvent vapor. In this instance it is desirable to feed the copolymer solution, including condensed steam resulting from the first step, to a flashing chamber which should be large enough to minimize entrainment of liquid in the rising vapors. In the flasher the pressure should be maintained slightly above atmospheric if it is desirable to prevent leakage of air into the system. Typical values are 4 to 15 p.s.i.g. It is not advantageous to use too high a pressure because increasing the pressure changes the liquid vapor equilibrium so that the steam requirement and the flasher temperature are higher than necessary. The flasher temperature depends on the flasher pressure and the ratio of flow rates of steam and copolymer solution.

The copolymer solution and the condensed fraction of the steam are passed into a high shear mixer where, in the second step, they are treated with dilute aqueous mineral acid.

Any conventional means for providing high shear agitation such as disk stirrers or propeller stirrers is suitable. If vigorous agitation means are not supplied, satisfactory purification will not occur. Representative mixing devices include: an 8-gallon vessel with two 6-inch diameter slotted disks rotated at 4700 r.p.m.; a 1.6-gallon vessel with two 3.75-inch diameter slotted disks rotated at 8000 r.p.m.

For economic reasons the contact time should be as short as possible. Representative times range from about 2 seconds to 10 minutes. The minimum time required for best results will depend on the copolymer solution. Solutions made from copolymers having lower Mooney viscosities may require less contact time than solutions made from more viscous copolymers. Similarly, the more viscous the copolymer, the higher the shear rate, other factors being equal.

Dilute sulfuric acid is the preferred mineral acid on account of its low volatility and moderate cost. Dilute hydrochloric acid is a representative alternative. Mixtures of mineral acids can be employed, if desired. The acid concentration is not critical as long as there is at least one gram-equivalent of acid for every gram-atom of vanadium and aluminum in the catalyst residue in the copolymer being purified. Incomplete purification will occur when less acid is provided. It is best to employ somewhat more than the theoretical minimum in order to anticipate fluctuations resulting from process upsets and control variations. Typical sulfuric acid concentrations have ranged from about 0.3 to 0.6% by weight. Unduly high acid concentrations should be avoided in order to avoid unnecessary expense and to facilitate acid removal in the final step. The amount of water supplied by the dilute mineral acid solution should be sufficiently high so that water acts as the continuous phase in the mixer. In tetrachloroethylene solution purification, the ratio of water to copolymer solution can be as low as 1:10 on a weight basis (equivalent to 1:6 on a volume basis); typically, the proportions have varied from 0.4:1 to 2:1. The mixed temperature depends upon the rate and temperature of the feed streams. The value is not critical; representative temperatures have ranged from 40 to 60° C.

The effluent from the device wherein the copolymer solution has been treated with the acid under high shear conditions is then sent to a device where it is washed with additional water to complete catalyst removal and the copolymer solution is then separated from the aqueous phase. In order to provide effective contact of the copolymer solution with water in this step, a device should be used such as a centrifugal multi-stage counter-current extractor.

Representative extractors are the Podbielniak contactors commercially available from Dresser Industries, Inc., Dallas, Tex. Such extractors are analogous to a sieve plate extraction column. The high shear mixer effluent and additional water flows countercurrently through the plates (bands) in the mixing zone. Several bands near the axis and at the rim are reserved for clarification of the aqueous phase and the copolymer solution phase. A water/copolymer solution interface is maintained within the machine by holding a back pressure on the light liquid exit line. The machine is rotated to increase the gravitational forces and to increase the velocity through the band holes. When the copolymer solution is heavier than water, acceleration of the heavy copolymer solution as it flows outward toward the rim and deceleration of the water as it moves toward the axis causes shear and turbulence between the bands; when the copolymer solution is lighter than water, it will move toward the axis and the water will go to the rim. The static pressure as a function of speed and interface position is given by the equation $$P = Kr^2n^2\rho$$

where $P$ = pressure
$r$ = radius
$n$ = speed
$\rho$ = specific gravity relative to water
$K$ = constant dependent on units used.

Any deviation from the result during the operation represents pressure drop due to flow. These pressures assume the heavy liquid is discharging at atmospheric pressure. Any back-pressure imposed on this line, as from a long discharge line or elevated storage tank, adds directly to the entire system pressure.

The lower limit of the water used in this final step should be at least about 0.4 volume per volume of copolymer solution. The upper limit is set by the device being used. With a Podbielniak contactor this upper limit is the value at which the extractor floods (the two phases will no longer flow countercurrently through the bands); the value is determined by the equipment design. The temperature of the water is not critical; ambient temperature, e.g. 5 to 30° C., is most convenient. The water can be heated without adverse effect.

The upper limit of the flow rate from the high shear mixer to the extractor used in the final step is determined by the capacity of the extractor. A representative device will handle about 2–3 gallons per minute of copolymer solution per inch of axial length.

A typical set of all extractor variables is given in the examples wherein Podbielniak extractors were used. With these extractors the rate of rotation determines the magnitude of the gravitational force and the degree of rotational turbulence. Typical rates have had values ranging from 1100 to 2000 r.p.m. As the speed is raised the capacity of the extractor (throughout just short of flooding) is increased and the quality of the extraction is apparently slightly improved. The interface between the copolymer solution and the aqueous phase can be allowed to move toward the axis or the rim until copolymer solution appears in the outgoing aqueous stream and, vice versa, aqueous effluent shows up in the emerging copolymer stream. In the case where the copolymer solution is heavier than water, the heavy liquid outstream will consist of all the copolymer solution fed to the extractor, and the light liquid outstream will contain all of the aqueous phase fed to the extractor from the high shear mixer as well as the water supplied to the extractor at the light liquid inlet; the aqueous phase is maintained in the extractor by holding a back-pressure on the water discharge line to overcome the unbalanced hydraulic leg. The magnitude of the pressure can be calculated from the following equation:

$$\Delta P = Kr^2n^2\Delta\rho$$

where $\Delta P$ = light liquid out pressure minus heavy liquid out pressure
$r$ = interfacial radius
$n$ = speed of rotation
$\Delta\rho$ = difference in specific gravity between the phases
$K$ = constant dependent on units used.

The copolymer solution emerging from the device used in the final step is ready for use as such or can be sent to concentration means, e.g. drum dryer, for isolation of the copolymer.

The following examples will better illustrate the nature of the present invention; however, the invention is not intended to be limited to these examples. Parts are by weight unless otherwise indicated.

EXAMPLE 1

A. *Preparation of ethylene/propylene/1,4-hexadiene copolymer solution*

An ethylene/propylene/1,4-hexadiene copolymer having a Mooney viscosity (ML–4/250° F.) of about 70 and containing about 44% propylene and about 4% 1,4-hexadiene units was prepared in tetrachloroethylene using a vanadium oxytrichloride-diisobutyl aluminum monochloride catalyst according to the procedures described in U.S. Patent 2,933,480. The vanadium concentration in the copolymer solution (dry copolymer basis) was about 1000–1100 p.p.m. The weight percent copolymer in the solution was 2.4.

B. *Purification of the reactor effluent*

The copolymer solution (ethylene/propylene/1,4-hexadiene copolymer, tetrachloroethylene, unreacted monomers, catalyst) from A above was passed at a temperature of 40–50° C. through a back-pressure control to the upstream side of a horizontal turbannular stripper, which was a 20-foot pipe having an inner diameter of 1.04 inches. Live steam was passed through a steam control system at 150–170 lb./hr. to the upstream side of the stripper where it contacted the solution; enough monomers and tetrachloroethylene were vaporized to maintain 3.5–4.5 weight percent copolymer in the liquid organic phase in a flasher which was located at the downstream end of the stripper and kept at 4.5 p.s.i.g. The effluent from the base of the flasher was sent at the rate of 55 gallons/hr. to a T-joint where it was joined by a dilute sulfuric acid stream. The dilute acid was prepared by supplying concentrated sulfuric acid at the rate of 2.8 lbs./hr. and water at the rate of 675 lb./hr. (80 gallons/hr.) to a mixing T. The flasher effluent and dilute acid were passed into a high shear mixer having an 8-gallon capacity and equipped with 2-flat-disk agitator blades six inches in diameter and rotated at 4500 to 5000 r.p.m. The effluent from the mixer was introduced into a Podbielniak countercurrent extractor, Model 9605, at the rate of 135 gallons/hr. and at a temperature of 46° C.; simultaneously water was introduced into the extractor at the rate of 67 gallons/hr. at a temperature of 57° C.

The extractor employed had a rotor element mounted in stator elements by mechanical seals. The heavy liquid mixture from the high shear acid contactor entered at the end of one of the stators, flowed centrally along its axis past a set of seals to a point a little before the center of the rotor, traveled along a passage in the rotor normal to the axis, and emerged within the concentric bands in the rotor about ⅔ of the radial distance to the edge of the rotor. The wash water (light liquid) entered at the end of the other stator, flowed centrally along its axis past a set of seals to a point about one-third the distance to the center of the rotor, traveled along a passage in the rotor normal to the axis, and emerged within the concentric bands in the rotor near the outer edge of the radial distance. On account of the centrifugal action, the heavy liquid travels through the holes in the bands in an outward direction countercurrently to the light liquid which moves toward the axis. An interface is set up. Extraction of the copolymer solution occurs in the rotor region between the points where the two liquids enter. Copolymer solution clarification occurs in the region between the entry port of the water and the outer edge of the rotor; the purified solution is taken off at the edge by way of a passage leading back to the axis and along it, leaving at the stator. Clarification of the aqueous phase occurs in the region between the entry of the copolymer solution and the innermost band of the rotor. The aqueous phase is taken off near the axis and discharged at the other stator element.

Relative to the pressure of the emerging copolymer stream from the extractor the entering mixer effluent pressure was 137 p.s.i. and the entering water pressure was 112 p.s.i.; the emerging aqueous phase pressure was 117 p.s.i. The Podbielniak extractor was operated at 1100 r.p.m. and the calculated interface radius was 15+ inches. The emerging purified copolymer solution was at 52° C. and had 0% acidity; the weight percent copolymer was 4.1%. Analysis of the vanadium in the copolymer solution gave a value of less than 10 p.p.m. (dry copolymer basis). The emerging aqueous phase was at 60° C. and had 0.21% acidity.

The Podbielniak extractor used in this example had the following dimensions:

| | |
|---|---|
| Internal radius, in. | 17 |
| Radius of hub, in. | 2 |
| Effective axial length, in. | 1.5 |
| Total number of bands | 38 |
| Water clarification zone: | |
| Bands No. | 1 to 12 |
| Holes rows | 2 |
| Diameter, in. | 0.25 |
| Spacing | 0.625 |
| Extraction zone: | |
| Bands No. | 13 to 33 |
| Holes rows | 2 |
| Diameter, in. | 0.25 |
| Spacing | 1 |
| Polymer clarification zone: | |
| Bands No. | 34 to 38 |
| Holes rows | 2 |
| Diameter, in. | 0.25 |
| Spacing | 1 |

C. *Effect of omitting the steam*

The procedure of Part B above was repeated except that the direct steam addition to the turbannular stripper was stopped; heat was added through the stripper walls, using a steam jacket and electrical heaters wrapped around the pipe. The copolymer solution removed 85 minutes later from the Podbielniak extractor had 43 p.p.m. vanadium (dry copolymer basis); a sample taken 4 hours after that one had 107 p.p.m.; a third sample taken 2 hours later had 104 p.p.m. Direct stream was reintroduced to restore the conditions of Part B; a sample removed after 2 hours contained less than 10 p.p.m. vanadium.

EXAMPLE 2

A. *Preparation of ethylene/propylene/1,4-hexadiene copolymer solution*

The copolymer solution was prepared according to Example 1A.

B. *Purification of the reactor effluent*

The general procedure of Part B of Example 1 was repeated except as noted hereinafter.

Steam flow (160–170 lb./hr.) to the turbannular stripper was controlled to maintain 3–4 weight percent copolymer in the liquid organic phase in the flasher. The streams fed to the high shear mixer supplied 76 ga./hr. of copolymer solution and 74 gal./hr. of 0.33 weight percent sulfuric acid. The effluent from the mixer was washed in the Podbielniak extractor with water supplied at 70 gal./hr. The purified copolymer solution had on the average 0.00036% acid and contained less than 10 p.p.m. vanadium (dry copolymer basis).

The Podbielniak extractor used in this example had the following dimensions:

| | |
|---|---|
| Internal radius, in. | 17 |
| Radius of hub, in. | 2 |
| Effective axial length, in. | 1.75 |
| Total number of bands | 39 |
| Water clarification zone: | |
| Bands No. | 1 to 11 |
| Holes rows | 2 |
| Diameter, in. | 0.25 |
| Spacing | 1 |
| Extraction zone: | |
| Bands No. | 12 to 31 |
| Holes rows | 2 |
| Diameter, in. | 0.125 |
| Spacing | 1 |
| Polymer clarification zone: | |
| Bands No. | 32 to 39 |
| Holes rows | 2 |
| Diameter, in. | 0.25 |
| Spacing | 1 |

C. *Effect of eliminating the high shear acid mixer*

For 26 hours the high shear acid mixer was by-passed during the operation of Part B. The copolymer solution emerging from the Podbielniak extractor had, on the average, 0.0002% acidity, but 74 p.p.m. vanadium.

As many widely different embodiments of this invention may be made without departing from the spirit and scope thereof, it is to be understood that this invention is not limited to the specific embodiments thereof except as defined in the appended claims.

What is claimed is:

1. The process for removing vanadium coordination catalyst residues from a solution of an α-olefin hydrocarbon copolymer, wherein said catalyst is prepared from a vanadium compound and an organo-aluminum compound, which process comprises
   (1) contacting said copolymer solution with steam under velocity conditions sufficient to cause a turbulently flowing mixture containing at least a portion of said steam in condensed form;
   (2) contacting the mixture resulting from (1) above with dilute aqueous mineral acid under conditions of high shear agitation, with the number of gram equivalents of said acid being at least equal to the sum of the number of gram atoms of vanadium and aluminum; and
   (3) countercurrently contacting the resulting mixture from (2) above with water under turbulent conditions and separating the copolymer solution from the aqueous phase.

2. The process of claim 1 wherein step (1) is carried out in a co-current pipeline liquid gas contactor and step (3) is carried out in a countercurrent centrifugal extractor.

3. A process for reducing the vanadium coordination catalyst residues to less than about 10 parts per million in a tetrachloroethylene solution of an ethylene/propylene/1,4-hexadiene copolymer prepared from a catalyst comprising vanadyl chloride and diisobutylaluminum monochloride, which process comprises
   (1) contacting said copolymer solution with steam under velocity conditions sufficient to cause a turbulently flowing mixture containing at least a portion of said steam in condensed form;
   (2) contacting the mixture resulting from (1) above with dilute aqueous mineral acid under conditions of high shear agitation, with the number of gram equivalents of said acid being at least equal to the sum of the number of gram atoms of vanadium and aluminum; and (3) countercurrently contacting the resulting mixture from (2) above with water under turbulent conditions and separating the copolymer solution from the aqueous phase.

4. The process of claim 3 wherein said mineral acid is sulfuric acid.

References Cited

UNITED STATES PATENTS

| | | | |
|---|---|---|---|
| 2,886,561 | 5/1959 | Reynolds et al. | 260—94.9 |
| 2,918,461 | 12/1959 | Flynn | 260—94.9 |

JOSEPH L. SCHOFER, *Primary Examiner.*

L. EDELMAN, *Assistant Examiner.*